April 26, 1949. J. F. HUNTER 2,468,070
LIQUID SEPARATION APPARATUS
Filed Nov. 18, 1944 5 Sheets-Sheet 2
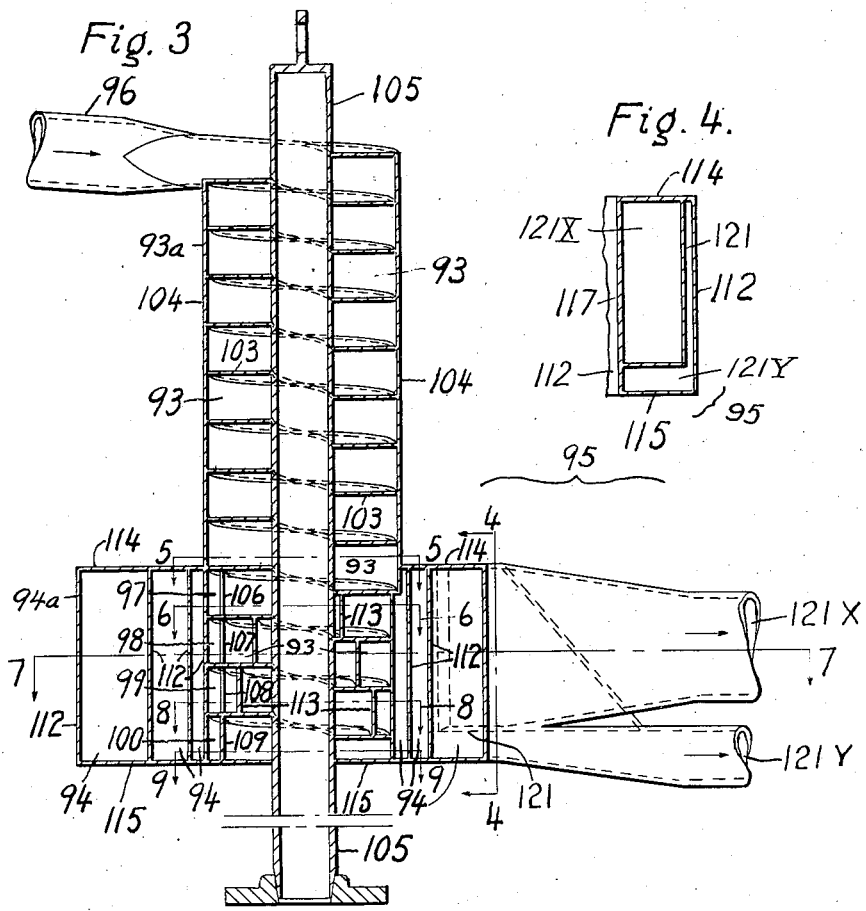

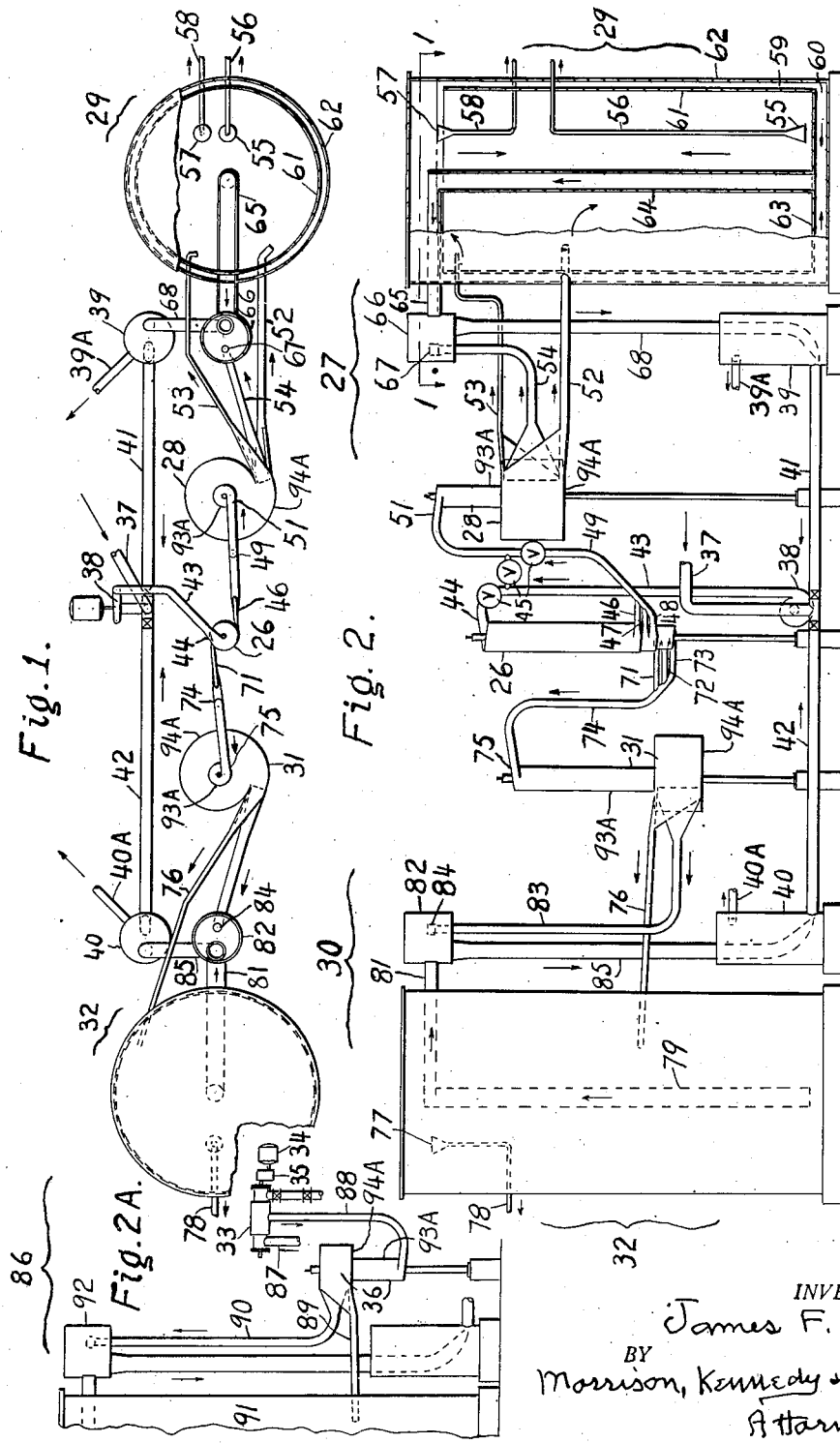

April 26, 1949.  J. F. HUNTER  2,468,070
LIQUID SEPARATION APPARATUS
Filed Nov. 18, 1944  5 Sheets-Sheet 3
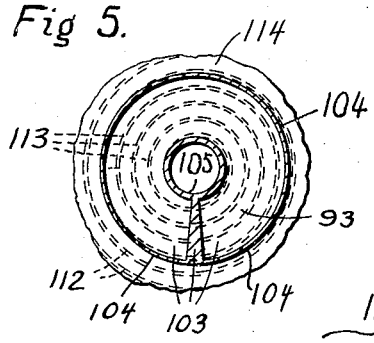
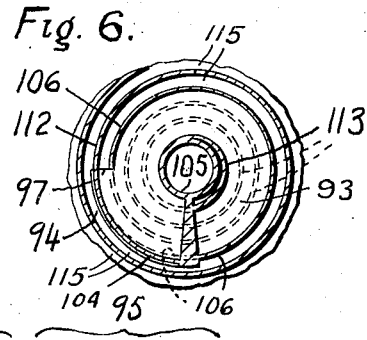
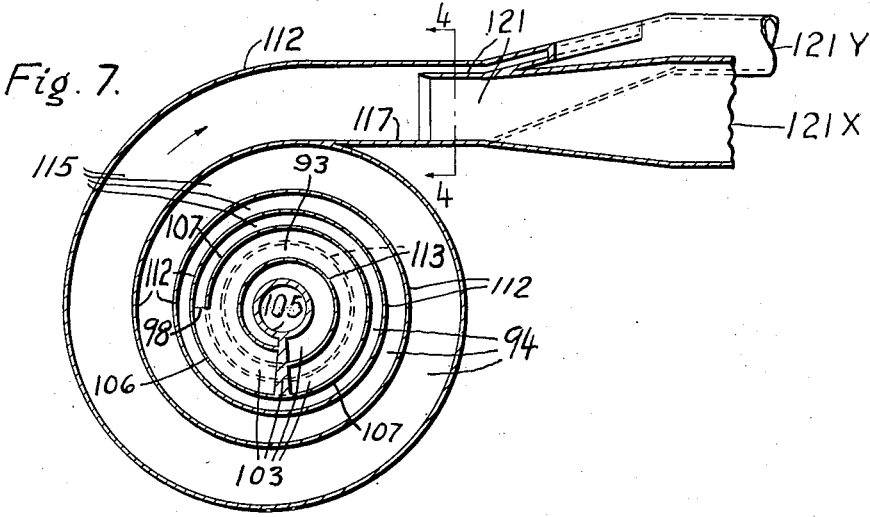
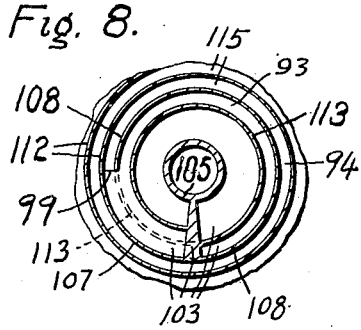
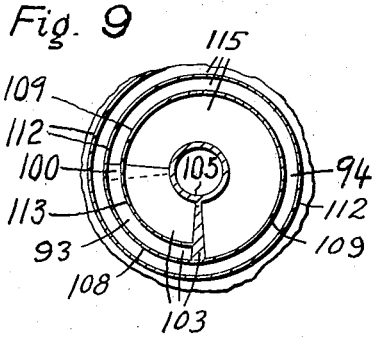
INVENTOR:
James F. Hunter
BY
Morrison, Kennedy & Campbell
ATTORNEYS.

April 26, 1949.　　　J. F. HUNTER　　　2,468,070
LIQUID SEPARATION APPARATUS
Filed Nov. 18, 1944　　　5 Sheets-Sheet 4
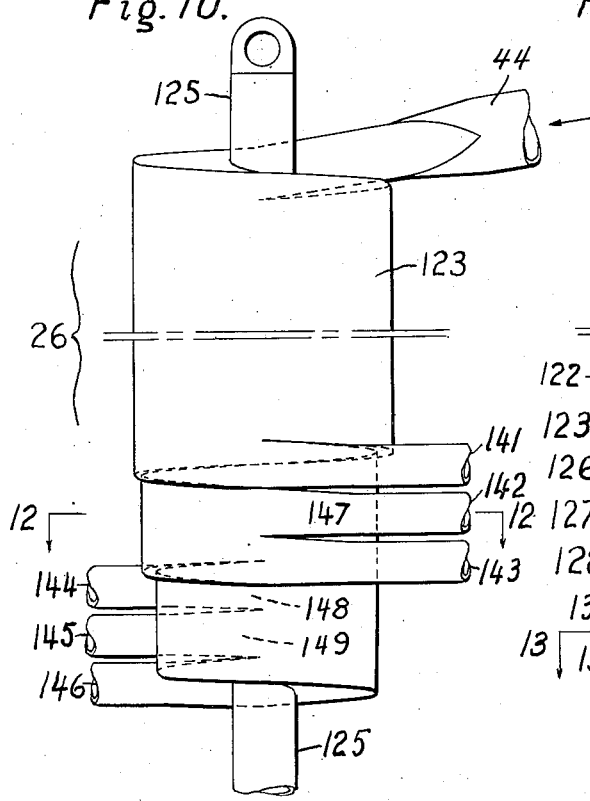
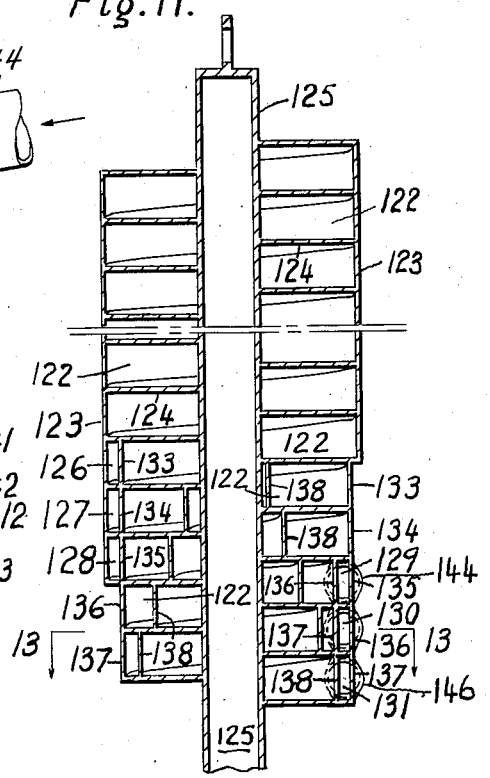
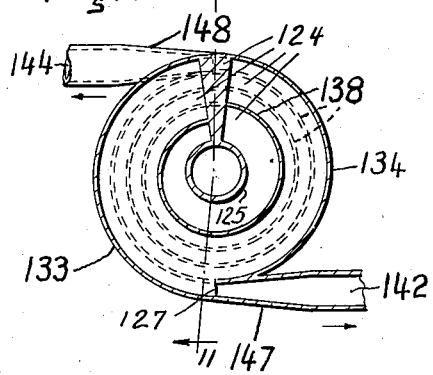
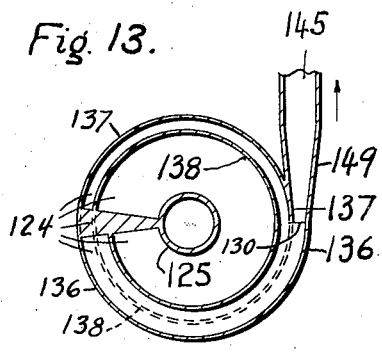
INVENTOR:
James F. Hunter
BY Morrison, Kennedy & Campbell
Attorneys.

April 26, 1949.  J. F. HUNTER  2,468,070
LIQUID SEPARATION APPARATUS
Filed Nov. 18, 1944  5 Sheets-Sheet 5

INVENTOR:
James F. Hunter
BY
Morrison, Kennedy & Campbell
Attorneys.

Patented Apr. 26, 1949

2,468,070

UNITED STATES PATENT OFFICE 2,468,070

LIQUID SEPARATION APPARATUS

James F. Hunter, New Rochelle, N. Y.

Application November 18, 1944, Serial No. 564,108

18 Claims. (Cl. 252—360)

This invention relates to liquid separation method and apparatus, of the kind adapted to operate upon two, or frequently three or more, component liquids having substantial differences in weight or specific gravity, and in viscosity or resistance to flow, or both, and usually with substantial preponderance in volume of one or more of the several components over the other or others thereof. The combined or associated liquids may be considered as immiscible in the sense that they do not become mixed inseparably or permanently but, whether as suspensions, emulsions or otherwise, are susceptible to classification or separation by gravity or centrifugal action or other decanting operation; and although the liquid-combination to be treated may thus be considered as one of immiscible liquids it may be conveniently referred to as the mixture thereof, in the sense of their temporary mixture, awaiting separation. The field of utility of the invention is wide, but as an instance of the aforesaid class of method and apparatus may be mentioned prior U. S. patent, Hunter No. 2,084,958 issued to this applicant June 22, 1937, showing a separating system designed particularly for handling, for instance, troublesome mixtures and emulsions of tars and oils with each other and with water.

In many industrial processes, economical operation calls for the continuous separation of the fluid components of plant wastes at the current rate of production thereof, so that the several separated liquids may be profitably and advantageously employed, as by recirculation for reuse, and for the recovery of contents thereof that have value as saleable by-products; and a further reason for separation is to comply with the usual regulations of local authorities adapted to prevent the pollution of inland or coastal waters.

This invention in one general aspect may be considered an improvement on the method and apparatus disclosed in said Hunter Patent No. 2,084,958, but some of the novel features hereof may be practiced independently of the prior disclosure. Specifically, the invention is usefully adapted, as with the prior patent, to the separation of the mixture of oil derivatives and water produced in the manufacture of carbureted water gas, but it is not intended to limit the disclosure to this purpose as it is applicable in the separation of any combination of liquids that can be separated by decantation.

For the sake of facility of description the terminology of the gas manufacturing industry is largely used in this specification, descriptively written on the basis of the separation of tar and oil from water, without limitation thereto. As used herein the term "oil" is to be considered as designating the lightest liquid in any given liquid mixture or combination, the term "tar" the heaviest liquid, and the term "water" the intermediate weight liquid in the combination. In some cases, as in the manufacture of gas, the oil and tar, while immiscible with the water, will mix readily with each other if brought into contact, but may often or usually be maintained as separate or separable entities by the presence of the preponderant water. In describing cases of the separation of combinations of more than three component liquids other designations will be used.

The necessity for breaking any emulsions and otherwise preparing the starting mixture of components for accelerated separation by the usual method of decantation is fully described in said Patent No. 2,084,958 and no further extended reference thereto need be made herein. An important object of the present invention is to provide for the more effective accomplishment of the desired separation, and another object is to accomplish this with smaller apparatus, reduced plant cost and lower operating expense. Other advantages will be hereinbelow set forth. The disclosure of said prior patent involves three method stages, namely, (1) mixing or conditioning the components of the starting liquor; (2) preparatory separation of components; and (3) decantation. The improvements of the present invention are concerned with the entire system but principally with the stage or step of preparation in advance of decantation.

As one feature of improvement the separation is preferably performed in a closed system under the pressure of a pump or other head, and this may be arranged to include the conditioning step. This feature has necessitated certain improvements or structural or operative changes in the mixing operation and unit and in other elements of the apparatus, to the benefit of uniformity and efficiency of separation.

Before describing the details of the present invention the following preliminary observations are made concerning the principles involved.

The liquid preparatory or separation step is hereinafter disclosed as being carried out in the apparatus unit herein sometimes termed the spiral or scroll element. In form this part may be generally like that of Fig. 11 of Patent No. 2,084,958 which shows in sectional elevation a modified form of scroll element. In the previous disclosure in said patent little attention was paid to this modification of the apparatus. With the addition of the improvements of the present invention this modification is found to be an important feature, being well adapted to several operations essential in the obtaining of optimum separating results.

The apparatus of this second stage will herein be sometimes referred to as the separating element instead of using the term "scroll element" as used previously, since the action of dewatering the tar is started in it and is carried to a point where the water particles or bodies become increased in size to an extent sufficient to bring about effective gravity separation in the decanter. Substantially complete dewatering could be accomplished in the separating element, but on account of the law of diminishing returns it has been found more practical to complete the separation in a decanter.

The separating element consists of two parts, each having its special duty in relation to or co-operation with the other, and each being capable also of operating separately in the performance of other functions embodied in the complete separating system, with novel aspects of structure and action.

Referring again to Patent No. 2,084,958 the scroll element shown in Fig. 11, as embodied in Figs. 12-15 of said patent, consists of an inlet 15, Figs. 12 and 13, the helical passage 150, Fig. 13, with the liquid withdrawal mouths 153 and 155, these delivering the flowing stream to the spiral passage 105, Fig. 12, which is formed by the convolutions of the membrane or wall 104 Figs. 11 and 12. The spiral passage 105, in Fig. 11, is closed at the top of the passage by the cover 109 and at the bottom by the plate 111. In this earlier disclosure, the separating element was placed in the decanter, and all of the flow through the separating element passed thence through the decanter which necessarily must be of sufficient capacity to permit the handling of this throughput volume, or else the throughput must be reduced to that volume which could be handled by the decanter without excessive turbulence. In this form of the separating element provision was made for the withdrawal of the tar from the inlet duct at the upper withdrawal mouths and the remainder of the flow was permitted to enter the spiral duct without control.

One of the features of improvement of the present invention provides complete control of the flow through the inlet duct by a progressive modification of the cross-section area of the inlet passage wherein the area of the passage is reduced at each withdrawal mouth substantially in proportion to the reduction in flow volume due to progressive withdrawals, whereby the velocity of flow is maintained steady or prevented from falling off to a detrimental extent, and the flowing combination is completely transferred currently to the spiral duct in such manner that the positions of all of the components are controlled and predetermined as the flow enters the spiral passage.

A second improvement feature of this invention provides a means whereby the greater part of the preponderant component (usually water) which may be sufficiently free from the other components and ready for reuse or for other desired disposal, is diverted from the decanter. Because of this improvement the volume of water necessary for preparation can be circulated through the separating element without necessitating an excessive volume of decanter in order to reduce the turbulence of flow sufficiently to permit effective decantation.

Other improvements in operating methods comprise the following. (3) Ability to separate a combination of more than three components by first breaking down the primary combination into secondary combinations none of which contain more than three components, and thereafter, by the method of this invention, separating each secondary combination into its several components, for desired disposal. (4) In the separation of a combination of three component liquids, where it is desired to withdraw the components as three separate liquids, as for instance, in a watery mixture, the oil and tar separate from each other, the process of dewatering can proceed with respect to all components concurrently and without interference. (5) When one of two components is present only in the form of an emulsion and the gravity differential is insufficient for rapid separation, the gravity of the emulsion may be purposely modified by introducing into the flow a quantity of a selected separated component, and by causing the emulsion to come in contact and mix with the recirculated separated component, whereby the gravity of the emulsion is substantially altered and rapid separation is made possible.

When the characteristics of the components are such that emulsions are non-existent, or if present are such as will break readily, the size of the separating element can be greatly reduced by the special feature of so re-arranging or reversing the apparatus that the heavier component will be caused to enter the spiral duct at the lower part of the duct and the lighter component will enter at the upper part of the duct, herein accomplished by inverting the separating element and flowing the combined liquids, under hydraulic head, upwardly from an inlet below the spiral passage instead of flowing the combined liquids downwardly from an inlet above the spiral passage.

It is to be understood that in many case the raw starting liquor, as received from the plant, is in a hot condition; which in the case of gas plant waste containing tar is sometimes essential to the fluidity of the tar component; but in other cases the temperature may be that of the surrounding atmosphere.

Because of changing fire and temperature conditions in the usual carbureted water gas manufacturing plant the tar produced varies, through a relatively wide range, in the characteristics that affect the separability of emulsions of tar and water which are formed when the condensable oil vapors, having various compositions, are condensed in an atmosphere of condensing water vapor, that is, excess process steam. Investigation indicates that for the best separating results, each variety of tar has its critical or optimum condition of treatment in the spiral passage, which condition lies within relatively close limits. The treatment condition varies according to the difference in the velocities of the components, certain of which components or portions thereof are retarded by friction in contact with the passage wall. As the flow of the preponderant component, usually water, is one of the principal factors in the preparation process, and since this flow is what causes the flow of the retarded component, the relative velocities are under reasonably complete control in the spiral passage, and the relation between them will vary, for example, inversely with the width of the passage when the height of the passage and the volume rate of flow are constant. By gradually changing the width, and thereby the area, of the passage, the velocity of flow of the preponderant component and thereby the relation of the velocities of the several components may be controlled during the traversing of the length of the passage, so that each variety of tar, when several are present, will be subjected to optimum preparation conditions for a greater or less period depending on certain factors such as the rate of change of the width of the spiral passage, provided that the required preparation conditions for the various tars fall within the range between the upper and lower limits set by the available flow volume and the area of the passage.

The accompanying drawings show a number of illustrative embodiments of the apparatus and method of the present invention.

Fig. 1 is a plan view, and Fig. 2 is an elevational view partly in section, both in diagrammatic form, of an embodiment of a complete liquid separating installation adapted for handling a combination of more than three component liquids, and comprising both primary and secondary separator systems.

Fig. 2A is an elevational view in diagrammatic form of a portion of a modified separating system, in this instance having the pressure-type of mixer and the upflow type of separating element.

Fig. 3 is a central vertical section and partial front elevation of a modified separating element, corresponding largely with separating element 31 of Figs. 1 and 2, adapted for a combination of two components in which the preponderant component is the lighter.

Fig. 4 is a righthand view in section on the line 4—4 of Fig. 3 or Fig. 7 showing the partitions or inner walls which form the liquid withdrawal mouths.

Fig. 4A is a similar section showing an alternative arrangement of partitions adapted for the withdrawal mouths for separating a combination of two components in which the preponderant component is the heavier.

Fig. 4B is a similar section showing an alternative arrangement of partitions adapted for the separation of a combination of three components in which the component of intermediate weight is preponderant in volume and in which the volume of the heaviest component exceeds the volume of the lightest component.

Fig. 4C is a similar section showing an alternative arrangement of partitions adapted for the separation and separate withdrawal of three components in five separate withdrawal mouths for recombination as desired.

Fig. 5 is a horizontal section taken on the line 5—5 of Fig. 3.

Fig. 6 is a horizontal section taken on the line 6—6 of Fig. 3.

Fig. 7 is a horizontal section taken on the line 7—7 of Fig. 3.

Fig. 8 is a horizontal section taken on the line 8—8 of Fig. 3.

Fig. 9 is a horizontal section taken on the line 9—9 of Fig. 3.

Fig. 10 is an elevation on a larger scale than Figs. 1 and 2, of the primary separator or assorting unit of helical duct type.

Fig. 11 is a central vertical section of the primary separator of Fig. 10 or Fig. 12, looking leftward.

Fig. 12 is a horizontal section taken on the line 12—12 of Fig. 10.

Fig. 13 is a horizontal section taken on the line 13—13 of Fig. 11.

Figure 14:
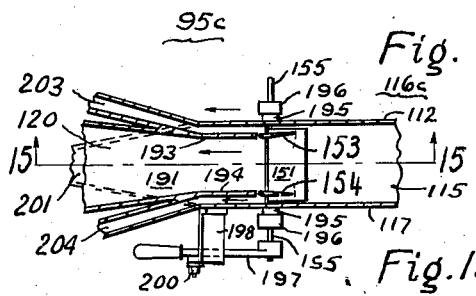
Fig. 14 is a horizontal central section taken on the line 14—14 of Fig. 15, showing a portion of the transformation section of a separating element having adjustable vanes for regulating the effective area of the withdrawal mouths.

The following description of the various apparatus units, elements and devices shown in the drawings may be first generally outlined as follows. A separating installation or apparatus as a whole, capable of performing the method of this invention, is illustrated in Figs. 1 and 2, these figures illustrating a primary separating or assorting unit 26, and two separator systems 27 and 30 containing respectively secondary separator elements 28 and 31 delivering to decanters 29 and 32 respectively; while in Fig. 2A is shown a modification of part of Fig. 2, with a system 86 wherein the separating element is replaced by an inverted separating element 36, that is, with upflow instead of downflow, preceded by a conditioner 33 and delivering to a decanter 91. The liquid mixture in traversing the primary separator 26 is preliminarily assorted and reassembled into two secondary combinations which next are passed through the systems 27 and 30 respectively wherein is continued the preparation of the components for decanting; it being understood that either or both of systems 27 or 30 could be replaced by the system 86 of Fig. 2A. Following these will next be described the construction and details of the separator elements 28 and 31, by reference to Figs. 3 to 9, with modifications in Figs. 4A, 4B and 4C. Next thereafter will be described the primary separator or assorter 26, with reference to Figs. 10 to 13. This will be followed by a description of a desirable means for adjusting the sizes or areas of the withdrawal mouths or outlets of the separator element, as a part of the control of the general operation, with reference to Figs. 14, 15 and 16. Thereafter will be described the details of the special conditioner or mixer element 33, as shown in Fig. 2A supplemented by details shown in Figs. 17, 18, and with a modification in Fig. 18A. Following these will be a review or summary of the entire operation of the apparatus including the method steps of the present invention.

Referring first to the general or entire installation, Figs. 1 and 2 show in diagrammatic form, in plan and elevation, a complete separating apparatus adapted for the continuous separation of a combination of two or three, or more than three, immiscible liquid components. The apparatus comprises in general beyond the inlet (*a*) the assorter or primary separator 26, useful when there are over three liquids, (*b*) the secondary separating system 27, adapted for the separation of a combination of three components, which includes among its elements a separator element 28 and a decanter 29, and (*c*) the secondary separating system 30, adapted for separating a combination of two components, which includes a separator element 31 and a decanter 32. With two components either of sub-systems 27 or 30 can be used and the other omitted; while with three components sub-system 27 alone can be used; in either case the assorter 26 being unnecessary. To so convert the apparatus any suitable valving may be used, e. g. as shown in Fig. 2, the device 45, consisting of a bypass cross-pipe connecting supply pipe 43 directly to the pipe 49 leading to separator 28; with a valve in the cross pipe openable to cut out assorter 26 and separator system 30, and with closable valves in pipe 43 above and in pipe 49 below the cross-pipe. With four liquids the assorter divides the flow into two groups, one containing three liquids, going to separator 28, the other two liquids, going to separator 31, one intermediate liquid being common to both groups.

Fig. 2A shows a modification of the sub-system 30 for the separation of a combination of two components in which there is included the special conditioner or mixing element 33 driven by motor 34 through speed changer 35, to be further described on Figs. 17 and 18, and in which the separator element 36 is of the upflow type already mentioned with its inlet placed below the spiral passage, otherwise similar to separator 31 to be described.

The flow of initially combined immiscible components from the plant enters the separating system through inlet pipe 37 and is forced through the system by a means to provide forcing head, preferably a pump 38. Pump 38 should be designed to deliver at a constant rate or volume somewhat in excess of the maximum expected production of combined liquids to be separated. The liquid that is required to make up the deficiency in pumped supply is a separated component, usually water drawn from lower overflow tanks 39 or 40, or both of them, through pipes 41 or 42, leading to the pump. The excess overflow connections 39A and 40A of tanks 39 and 40 are placed at a level lower than the initial source of supply 37 of combined liquids to be separated, so that the supply to pump 38 for recirculation is automatically provided, in a manner to make up for recurrent variations in the rate of supply of the starting liquor or mixture. When required to provide greater mass or weight of flow for preparation, the volume of the recirculated component can be increased by increasing the pump capacity, as by pump control means. A mixer preferably precedes the inlet pump 38 or pipe 37, such as that shown in Figs. 1 and 5 of said patent, to condition the mixture for separation; or the conditioner 33 shown in Figs. 2A, 17 and 18 hereof may be used.

The flow of combined liquids passes from pump 38 through outlet pipe 43 to the inlet 44 of the primary separator 26 in which the primary liquid combination is separated into secondary combinations for subsequent complete separation. In the case shown the division is into two secondary combinations consisting of a plurality of the heavier and a plurality of the lighter components respectively. The operation of the primary separator and of the other pieces of apparatus will be described in detail in connection with the description of the detailed figures.

In the operation of the primary separator the heavier components are withdrawn at the first or earlier withdrawal outlets to disposal pipes 46, 47 and 48 (corresponding to 141, 142 and 143 in Fig. 10) which are joined in pipe 49 through which the withdrawn heavier secondary combination is delivered, without rehandling, to the inlet 51 of the separating element 28 in which the components are prepared for decantation. Secondary separating system 27 as noted comprises the element 28 and decanter 29, and is adapted for the separation of a combination of three components. The element 28 has lower 52, upper 53 and intermediate 54 discharge passages.

The heaviest component in the withdrawn heavier secondary liquid group or combination leaves separating element 28 through withdrawal passage or pipe 52 in combination with a minimum quantity of the intermediate component, and, sinking to the bottom of the decanter, is withdrawn as a separated component through an outlet or mouthpiece 55 and rising disposal pipe 56 to an exterior point for desired disposal.

Similarly, the lightest component leaves separating element 28 through withdrawal pipe 53 in combination with a minimum quantity of the intermediate component, and entering the decanter rises to the top, and leaves the decanter through an outlet 57 and disposal pipe 58, to an exterior point.

The portions of the intermediate component entering the decanter with the heaviest and lightest components, after decanting separation therefrom, is flowed over the edge of the inner tank 61, below the accumulated floating layer of the lightest component, and descends in the annular passage 59 between the inner tank 61 and outer tank 62, thence passes through space 69 under the inner tank bottom 63, rises through the interior riser pipe 64 and overflows through trough 65 to an upper overflow tank 66 of separating system 27. In said overflow tank the intermediate liquid component is combined with the intermediate component which is withdrawn from separating element 28, free from the heaviest and lightest components, through withdrawal pipe 54 which leads not to the decanter 29 but bypasses directly to the upper overflow tank, where it overflows an adjustable weir 67 by means of which the quantity or proportion of intermediate component delivered from the element 28 to the decanter along with the heaviest and lightest components can be controlled. The weir in this use of it, where the actions are not static but are kinetic, operates as a means for controlling or predetermining the resistance to and the flow through the passage 54 relative to the resistances and flows through the other withdrawal passages 52 and 53; whereby the actual velocity and volume of flow in such respective passages is adjustably predetermined, thereby controlling the volume of flow to and through the decanter. The separated intermediate component descends through pipe 68 to the lower overflow tank 39 and either returns to pump 38 by pipe 41 for recirculation or overflows partly or wholly through outlet 39A to other desired disposal. The double tank arrangement of decanter 29 is used principally in cases of separation of combinations with which heat must be conserved or added. The hot liquid or water surrounding and underlying the inner tank minimizes the loss of heat from the heavy liquid or fluent tar within the inner tank. The decanter 29 is adapted to separate a mixture of three liquid components and deliver them separately. Its main or inner tank 61 is spaced at its side wall from the jacketing outer tank wall 62, providing the downflow passage 59 between them for the preponderating intermediate component; while the inner tank bottom wall 63 is spaced above the outer tank bottom, providing the inflow space 60, leading to a port in the inner bottom wall which delivers upwardly through an uptake passage or riser 64. Said riser extends slightly above the liquid level and into a trough 65 carrying the intermediate component to the upper overflow tank 66.

The separator exit pipe 52 extends through both tank walls 62 and 61 and constitutes the inlet for the heaviest component into the decanting tank 61. The separator pipe 53 likewise penetrates both walls as an inlet for the lightest component. The separator pipe 54 bypasses much of the preponderant intermediate component or water directly to the overflow tank 66. Each of the heaviest and lightest components also may have combined with it much of the intermediate component. By the slow decanting action the three components separate in the inner main tank. The heaviest descends and accumulates, and is drawn away, the liquid head assisting, through a low outlet mouth 55 and uptake pipe 56 which turns outward, penetrating the walls 61 and 62 to an exterior disposal point. The lightest component rises, floating atop the intermediate component and overflowing by a suitable exit, such as the elevated conical mouth 57, whence it descends by pipe 58 which turns outward through the decanter walls to its exterior disposal point.

The preponderant intermediate component rises in the inner tank to its overflow edge, somewhat below the mouth 57, and thus overflows, to descend by passage 59 and ascend by riser pipe 64 to the outlet trough as described. The three components are thus delivered separately. The lightest floats high upon the intermediate and flows out only by the mouth 57 since the layer of lightest component is insufficiently deep to be swept over the edge of wall 61 into passage 59. The intermediate component flows over and down in a very slow and quiet manner, having as it does the full circumference of the tank wall 61 as its weir; and the velocity of its overflow is safely insufficient to overcome the decanting force of gravity which holds up the lightest component layer buoyantly above the body of the intermediate component.

In the operation of the primary separator 26 the lighter components are withdrawn at the second or later group of withdrawal mouths, being the lower group due to the downflow, thence passing into disposal pipes 71, 72 and 73 respectively (corresponding to 144, 145 and 146 in Fig. 10) which pipes or passages become combined, with confluence of the several components, in pipe 74, through which the withdrawn lighter secondary group or combination is delivered, without rehandling, to the inlet 75 of the separating element 31, of the secondary separating system 30, in which element the components are prepared for decantation. Secondary system 30, as noted is arranged for the separation of a combination of two components, as an example of the invention differing from system 27 already described, and presenting, along with assorter 26 and separating system 27, an entire apparatus suitable for handling starting mixtures of four components, one of which will be present in both liquid groups.

The lighter component of the secondary liquid combination leaves separating element 31 and enters decanter 32 through withdrawal pipe 76 in combination with a minimum quantity of the heavier component, and rising to the top of the decanter is withdrawn as a separated component through outlet 77 and disposal pipe 78 for desired disposal. The portion of the heavier component which may enter the decanter with the lighter component sinks to the bottom of the decanter and is withdrawn through interior riser 79 and overflow trough 81 to the upper overflow tank 82 of separating system 30, where it combines with the balance of the heavier component which is withdrawn from separating element 31 through withdrawal pipe 83 and is diverted from the decanter and, free from the lighter component, is delivered to the upper overflow tank 82 over adjustable weir 84 by means of which the quantity of heavier component entering the decanter with the lighter component is controlled. The separated heavier component descends through pipe 85 to the lower overflow tank 40 and either is returned to pump 38 for recirculation or overflows through pipe 40A to other desired disposal.

Fig. 2A shows a modified secondary separating system 30 in which there is included a mixing element 33 of the pressure type, its details being shown in Figs. 17, 18 and 18A, and in which the separating element 36 is of the upflow type, with the inlet below the spiral passage. In the separation of a combination in which one component is present only as an emulsion, and in which the gravity differential is too small fo rapid and effective preparation and separation, it is found necessary to modify the gravity of the emulsion by introducing into the inflowing stream a quantity of a separated component, previously obtained, which is caused to come in contact and mix with the emulsion, effecting the desired modification in gravity. The recirculated separated component to be mixed with the emulsion may be introduced into the inlet pipe 87 (which leads to the driven mixer element 33) at any convenient point; such special inlet and the necessary pump and connections being not shown.

The conditioning action of the closed type of mixing element 33 may be generally the same as was described in detail in connection with the open type of mixing element shown in Figs. 1 and 5 of the prior Patent No. 2,084,958; the differences will be described hereinafter in detail. The combined liquid components leave the mixer 33 through pipe 88 and enter the central inlet channel of separator element 36 for preparation for decantation. Separator element 36 is indicated as being of the upflow type, the construction of which may otherwise be the same as that of a separating element of the downflow type to be detailed. In operation the heaviest component is withdrawn at the first withdrawal mouth which in the case of separator element 36 is the lowest mouth, and at a succeeding mouth or mouths if required, so that the heavy component enters the spiral duct at its lower part. Under conditions where the components are easily separated it is possible to shorten the lineal length of the spiral passage with a consequent saving in plant cost. After withdrawal from separator element 36 the operation of the separating system 86 of Fig. 2A is the same as the operation of separating system 30 already described and needs no further explanation as to how the liquids pass into and later from the decanter, except to point out that the heavier and lighter liquids pass from separator element 36 by pipes 89 and 90 to decanter 91 and tank 92.

The general structure and operation of a complete liquid separation system embodying the improvements of this invention having been described, the preferred structure and operation of the respective units of the apparatus will be described in detail, beginning with the separator element 28 or 31 or 36, and with special reference to that of Figs. 3 to 9, similar to the element 31.

The separator element is shown as an improved development of the form of scroll element shown in Figs. 11 to 15 of prior Patent No. 2,084,958. The complete separating element comprises a central inlet channel 93, Fig. 3, preferably a vertical or descending helix, supplied by inlet 96 (corresponding to inlet 75 in Figs. 1 and 2) and enclosed by upright casing 104 (corresponding with inlet unit 93A in Figs. 1 and 2) and providing an annular helical flow passage 93 which at its latter part is continued as a surrounding spiral duct or outflow passage 94, Figs. 3 and 6 to 9, (corresponding with spiral unit 94A in Figs. 1 and 2) and in turn is terminated by leading into a transformation section 95, Figs. 3 and 7. The separating element of this embodiment is arranged for the separation of two components of which the preponderant component (usually water) is the lighter component; and the figures show the downflow type of separating element. The two outgoing passages or pipes of the transformation section 95 are marked 121X for the lighter and 121Y for the heavier component and may correspond generally with withdrawal pipes 76 and 83 of Figs. 1 and 2. The described parts provide a closed continuous passage from the inlet pipe 96 to the outlet pipes 121X and 121Y. By the progress of the helical and spiral portions of the passage about the axis of the element the mass of the stream travels revolubly and so affords a differential action or classification of the component liquids of differing densities, the heavier taking the more outward paths or lanes by their greater centrifugal force.

Referring further to Figs. 3 to 9, the helical inlet channel 93, in which occurs a revolving or whirling flow, extends from the inlet 96 to successive withdrawal mouths 97, 98, 99 and 100, discharging at different levels into the spiral duct. The channel 93 is constituted of the space enclosed by the cylindrical outer casing 104, the successive convolutions of the helical membrane or enclosed wall 103, and the wall of a central upright inner pipe 105 enclosing idle or dead space. The mode of formation of the successive withdrawal mouths 97, 98, 99 and 100 by the differential positioning of spiral membranes or walls 106, 107, 108 and 109 respectively, Figs. 6, 7, 8 and 9, and the continuation of all of these membranes as the common membrane 112, which forms the wall of the spiral passage of the separating element, are generally described in the prior Patent No. 2,084,958 at page 5, column 1, line 73 et seq., and will be here further described. Referring first to Fig. 3, the first or top cover plate 114 of the spiral passage 94 is attached to the outer casing 104 of the helical inlet duct at the level of the top of the first or highest withdrawal mouth 97. At said first mouth 97 and continuing therebeyond in the convolutions of the helical inlet duct, the outer casing or wall 104 as such is discontinued. Also, at the first withdrawal mouth 97, Figs. 3 and 6, an upright membrane 106 starts, spaced inwardly from the position of wall 104 by the desired width of said first withdrawal mouth. Membrane 106 is attached at its top and bottom edges to the under and upper faces respectively of one turn of the helical membrane 103 which is the helical septum that forms the successive convolutions of the helical inlet duct 93 and also forms the top and bottom walls of the successive withdrawal mouths. The fourth or closing side of the first withdrawal mouth 97 is the inner end of the spiral membrane 112, Figs. 3 and 6, which extends upward and downward to and is joined with the respective cover plates 114 and 115 and is the septum which forms the succeeding convolutions of the outwardly trending spiral passage 94. The outer casing or wall 104, Figs. 3 and 6, in the convolution of the helical passage 93 preceding the first withdrawal mouth 97, terminates at the first withdrawal mouth 97 where it merges with and continues as part of the membrane 112, completing the four-sided enclosure of the first of the withdrawal mouths that discharge from the helical convolutions into the first spiral convolution.

The upright membrane 106, Figs. 3, 6 and 7, continues through a single convolution of the helical inlet duct, between convolutions of wall 103, forming a helical spiral in which the distance from the central axis increases by the width of the first withdrawal mouth. Membrane 106 extends to the second withdrawal mouth 98, Figs. 3 and 7, where it merges with and continues as part of the spiral membrane 112. These formations trend downwardly but in the separating element 36 of Fig. 2A would trend upwardly.

Similarly, succeeding withdrawal mouths are formed at the succeeding convolutions of the helical inlet duct by membranes 107, 108 and 109, Figs. 7, 8 and 9 respectively. Membranes 107 and 108 are incorporated in the structure in the same manner as described for membrane 106. These membranes start at their respective withdrawal mouths, and each terminates at the succeeding withdrawal mouth, whereat they each merge with and continue as membrane 112, between the convolutions of which occurs the confluence of the streams delivered from the helical to the spiral duct through the several mouths 106 to 109. Membrane 109 starts at the last, in this instance the lowest, withdrawal mouth 100, Figs. 3 and 9, and it extends from the last helical membrane convolution 103 to, and is attached to, the second or bottom cover plate 115; and membrane 109 terminates at the point where the membrane 108 merges with membrane 112 which is also attached to cover plate 115 as described. The forms of the membranes 106, 107, 108 and 109 are helical spiral curves in each of which the distance from the center or general axis increases by the width of the respective withdrawal mouths, and which curves extend preferably through one single convolution or 360°. The spiral duct 94 preferably has increasing area of cross section, for a number of convolutions, and at its outer end passes by way of continuation section 116 to the transformation section 95.

An advantageous further feature of the present disclosure is the introduction of an inner wall membrane 113 of spiral and helical character, Figs. 3 and 5 to 9, which starts at the wall of the central vertical pipe 105 in the same convolution with and in the radial plane of the start of the membrane 106 that forms the first withdrawal mouth 97, and trends downwardly and outwardly. Membrane 113 thus continues through the several final convolutions of the helical duct 93, extending below the top closure wall 114, and in which the withdrawal mouths are placed, and lies concentric with membranes 106, 107 and 108 which form the earlier mouths in the series of withdrawal mouths, and ends at the start of membrane 109, Figs. 3 and 9, which forms the last withdrawal mouth 100, and to which membrane 109 the membrane 113 is joined so that membrane 109 becomes the continuation and termination of membrane 113. In each convolution, in the lower end of the separating element, the distance between the wall of central pipe 105 and the membrane 113 increases by the extent of the width of the withdrawal mouth in that convolution of the helical duct 93, so that the area of the fluid passageway or helical duct is substantially proportional with the volume of flow at all points in the duct, whereby the velocity of flow is not lowered by the withdrawal but is maintained. The helical duct 93, thus effectively narrowed, terminates at the last withdrawal mouth so that the entire remaining flow is there currently transferred to the spiral passage 94. The progressively decreasing helical channel area is thus coordinated with the decreasing volume of flow therein, so that the whirling velocity and centrifugal force are sustained to the end, to the improvement of the classification of the liquids before being withdrawn into the spiral duct. Like the space within the central standpipe 105 the space within the helical-spiral inner membrane wall 113, between it and the pipe 105, is an idle or dead space, exterior to which the active ducts are disposed.

The spiral passage 94, within which the whirling or revolving flow continues, is the outwardly trending space enclosed between top wall 114, bottom wall 115 and the successive convolutions of the spiral wall or membrane 112; and said spiral membrane 112 is joined to and becomes the continuation of membranes 106, 107, 108 and 109 which form the withdrawal mouths of the helical inlet duct 93. Said top cover wall or plate 114 is attached to the outer wall 104 of the helical inlet duct. The top cover plate 114 and bottom plate 115 are attached to the top and bottom edges respectively of the spiral membrane 112 throughout its length so that the spiral passage 94 forms a closed continuation of the closed helical inlet duct 93. The sectional area of the spiral passage 94 varies with the width of the passage, the height being constant, and it can be designed or adapted to produce any desired velocity condition with constant volume of flow.

The spiral passage 94 terminates where, at tangency, it runs into the inlet section 116 (Fig. 7) of the transformation or withdrawal section 95. The inlet section 116 is a relatively short tangent passage enclosed by and between a continuation of the spiral membrane 112, an opposite vertical membrane 117, attached to and forming the continuation of the convex side of the next inward convolution of the spiral membrane 112, an extension of the top cover plate 114 and an extension of the bottom plate 115. The inlet section 116 and the transformation section 95, together, are sometimes referred to herein as the disposal section of the separating element; and here the whirling flow which has continued from element inlet 96 to its outlet 116 becomes transformed into advancing flow toward the decanter.

At the entrance of the transformation section the entire sectional area of the inlet passage 116 is divided by one or more membrane partitions into separate withdrawal mouths for the division and withdrawal of the several classified portions of the flow.

Fig. 4 shows a righthand view in section on the line 4—4 of Fig. 3 or Fig. 7. The arrangement shown in this view is preferred for the transformation section of a separating element adapted especially for the separation of a combination of two components in which the preponderant component is the lighter. The partitions 121 suitably divide the flow of the stream. The L-shape channel 121Y receives the heavier component which has been moved outward centrifugally and downward gravitationally; the remaining channel 121X receiving the preponderating lighter component.

Fig. 4A shows a modified partition 121A, in a sectional view corresponding with Fig. 4, of the transformation section of a separating element adapted for the separation of a combination of two components in which the preponderant component is the heavier. Its disposition and action are the reverse of those of Fig. 4.

Fig. 4B shows a further modified partition arrangement 121B, at the same sectional position, of the transformation section of a separating element adapted for the separation of a combination of three components in which the intermediate weight component is preponderant in volume. It provides a large central channel 120 for the intermediate component surrounded by peripheral L-shape channels corresponding to those of Figs. 4 and 4A.

Fig. 4C shows another modified partition arrangement 121C, at the same sectional position, with a simplified construction of the transformation section. The respective disposal pipes in this case can be selectively connected so as to recombine the withdrawn components in different ways as desired. Means for adjustment are disclosed in Figs. 14 and 14A.

The upright central portion or element of the separator 28, which contains the helical channel 93, is marked 93A, and the enlarged portion thereof containing the spiral duct 94 is marked 94A, on the drawings; and the corresponding portions of separators 31 and 36 are similarly designated, on Figs. 1, 2 and 2A.

In operation, the flow in the helical duct 93, throughout its closed outside or upper section and its inside or discharging section, is maintained at a velocity such that the several components by reason of their whirling motion and resulting centrifugal action are caused to occupy definite positions in the stream, the heaviest becoming placed at the outermost layer against the enclosing wall 104 and the lightest at the innermost layer, against the wall of central pipe or standard 105, or, further aong, in this instance, lower down, against the membrane 113 after the first withdrawal mouth 97 has been passed. The heaviest component, being against the outer wall 104 is withdrawn first, namely by the first mouth, or by the earlier group of mouths in the series of withdrawal mouths, if the volume of the heaviest component is too great, and thus enters the spiral passage 94 at its top portion in contact with the outer or concave wall 112 of the spiral passage, being a continuation of membranes 106—109. The action of the flowing portion or component of intermediate weight, which exists from channel 93 by the next mouth or group of mouths, in spreading, rolling and kneading the heaviest component as it is caused to traverse the spiral passage, descending across the spiral membrane 112 as it is moved along outwardly by the flow, is fully described in prior Patent No. 2,084,958 at page 5, column 1, line 28 et seq.; and the erosive action of the flowing stream in breaking the accumulated globules is there also fully described.

Similarly the lightest component takes its place against the inner wall 105 of the helical duct and is withdrawn at the final group or at the last in the series of withdrawal mouths, and so enters the spiral passage 94 at its bottom part, in contact with the inner or convex wall 112 of the spiral passage, and is subjected to the action of the flowing stream as it rises across the spiral membrane 112 while being caused to traverse the spiral passage. The component of intermediate weight is withdrawn by the intermediate mouths and takes a middle position between the heaviest and lightest components, in entering the spiral duct.

The position of the several components, whether two or more in number, entering and traversing the spiral passage is such that the preparation for decantation proceeds concurrently and without interference, with respect to all components. The final classified arrangement of components, two or more in number, progresses from the spiral duct to the transformation section 95, and thence at least partly to the decanter. The details of the transformation section 95 will next be further described.

In Figs. 3, 4 and 7 is shown a partition 121, which subdivides the transformation section 95 into two channels. This partition is L-shaped, having vertical and horizontal portions, and it starts in the inlet section 116 relatively close to the start of the transformation section 95. The arrangement shown is designed for the withdrawal of the components of a combination in which the lighter component is preponderant in volume, wherefore the larger channel is at the upper and inner part of the entire flow area. Fig. 4A shows the modified arrangement with an interior partition 121A subdividing the transformation section into two channels for the withdrawal of the components of a combination in which the heavier component is preponderant in volume. Separator element 31, Figs. 1 and 2, requires the partition arrangement 121A, Fig. 4A, the channels terminating in pipes 76 and 83 as previously described. In Figs. 3, 4 and 7 the partition 121 forms two channels, which are continued as disposal pipes 121X and 121Y, the former to accommodate the preponderating component. The partitions 121B and 121C, Figs. 4B and 4C have already been described.

It will be understood that the section 95 beyond the scroll outlet is a walled member or chamber in which the entire flow is transformed into subdivided streams apportioned approximately to the expected volumes of the respective components, the chamber being interiorly partitioned in one way or another for this purpose.

Describing further the embodiment of Fig. 4B which shows the arrangement of withdrawal mouths for the separation of a combination of three component liquids, in which the preponderant component is the intermediate weight component, and in which the volume of the heaviest component exceeds the volume of the lightest, the general position of the component liquids entering the inlet 116 of the transformation section 95 is as follows. The heaviest component will have reached the bottom of inlet passage 116, or is partially placed upon the side of the extension of membrane 112 if, in traversing the spiral passage, it has not completed its downward travel across the width of membrane 112; the lightest component is at the top of the inlet passage 116 or is placed on the wall 117 which forms the extension of the inner or convex wall of the spiral passage 94; the intermediate weight component, being the balance of the flow, occupies the balance of the area of inlet passage 116.

The withdrawal outlets of the transformation section 95 modified as in Fig. 4B, formed by the partition or septum 121B, are adapted to receive the components in the same arrangement as supplied by inlet 116. Thus, withdrawal outlet or channel 118, including the area at the bottom and along the extension of spiral membrane 112, is designed and dimensioned to receive all of the heaviest component and a minimum quantity of the intermediate weight component. Withdrawal outlet 119, including the area at the top and along the membrane 117 which forms the extension of the convex or inner wall of spiral passage 94, is similarly designed to receive all of the lightest component and a minimum quantity of the intermediate weight liquid. Withdrawal outlet 120, including the balance of the area of the inlet section 116, is designed to receive the balance of the flow, which comprises substantially all of the preponderant intermediate weight component, including both primary and recirculated separated intermediate component, free of the heaviest and the lighest components and ready for desired disposal. Each withdrawal mouth 118, 119 and 120 is connected to a separate disposal pipe. As an example separator 28, of the separating system 27, at the righthand sides of Figs. 1 and 2, requires the partitioning 121B of Fig. 4B, the channels being continued as pipes 52, 53 and 54; the intermediate liquid, as water, flowing by pipe 54 direct to the upper tank 66, and thence to the lower tank 39 as before described.

In Figs. 3 and 5 to 9 the membrane 113, which in this embodiment trends downwardly and outwardly to effect the progressive decrease of area and volume of the descending helical channel 93 as already explained, at the same time demarks or bounds a progressively increasing space enclosed between the membrane and the central standard or cylindrical wall 105, growing from zero area at level 6—6 to the full sectional area between wall 105 and spiral wall 109 at level 9—9; and this enclosed space, like the space enclosed inside the wall 105, is an idle or dead space, subtracted, for the purpose of coordinating the channel area with the decreasing flow, from the otherwise full area shown in the prior patent, Fig. 13. Thus the whirling velocity and classification are maintained.

When the characterstics of the component liquids do not present such conditions that extended preparation in the spiral passage or duct 94 is required to effect separation, the length of the passage to provide time for the components to traverse the vertical width of the spiral scroll or membrane 112, Fig. 3, can be reduced, which in turn reduces the necessary size of the separator element 28, 31 or 36 and its cost. To the same end the placing of the components as they pass from the helical inlet duct or channel 93 to the spiral passage or duct 94 may be the reverse of the arrangement described, the heaviest component being delivered into the spiral passage at its lower part, whereat it continues throughout its travel through the spiral passage, and the lightest component being placed at the upper part of the spiral passage where it continues. The separator element 36, Fig. 2A, shows the inverted arrangement to accomplish this result. The construction of separating element 36 may be otherwise as shown in Figs. 3 to 9. The element is positioned so that its inlet section 93A rises from below the spiral passage section 94A, and the flow in the inlet channel thus is upward, which is the reverse of the positioning of the separating elements 28 and 31. With upflow operation, the several components are caused to be placed in the flowing stream in the inlet channel 93 in the manner as described for the downflow type of separating element. The heaviest component moves outwardly and becomes positioned at the concave outer wall 104, Fig. 3, and thus is withdrawn at and by the first mouth or by the first group of mouths in the series of withdrawal mouths, which in this case are the lower mouths, and is thus delivered into the spiral passage at its lower part. The lightest component, becoming placed at the inner wall 105 and then wall 113 of the inlet duct, is withdrawn at the final group or at the last in the series of withdrawal mouths, which in this case are the higher mouths, and is thus delivered into the spiral passage at its upper part. Separator element 36, Fig. 2A, for the separation of a combination of two components in which the lighter component is preponderant in volume requires a transition arrangement such as that of partition 121, Fig. 4, the partitioned channels terminating in a pipe 89 delivering direct to the decanter 91 and a pipe 90 delivering to an upper overflow tank 92 and by-passing the decanter 91.

The primary separator or assorter 26, Figs. 1 and 2, is shown in detail in Figs. 10 to 13. Its function is to handle a multiple mixture, e. g. 4 or 5 components, and assort the components into groups of three or less liquids each, by specific gravity, for flow to and separation in two or more secondary separators, one for each liquid group. The construction and operation of the illustrated assorter is in principle substantially the same as the described helical inlet duct portion of one of the separator elements 28, 31 or 36 considered as far as its withdrawal outlets, omitting the spiral scroll portion thereof.

The helical duct 122 of the assorter 26 is the space enclosed by the outer shell or casing 123, and the successive convolutions of the helical membrane 124 and the inner or central cylindrical wall or pipe 125. Withdrawal mouths 126, 127, 128, 129, 130 and 131 are formed by the positioning of upright membrances 133, 134, 135, 136, 137 and 138 respectively. The inner membrane 138, corresponding with wall 113 in Fig. 3, starts at the wall of the inner pipe 125 in the same convolution with and in the radial plane of the start of the first upright membrane 133, which latter forms with the outer wall 123 the first mouth 126 in the series of withdrawal mouths. Membrane 138 continues through several convolutions concentric with membranes 133, 134, 135, 136 and 137, which form the successive withdrawal mouths 126 to 131 in the several convolutions, and terminates at the last mouth 131 in the series of withdrawal mouths, which mouth 131 is formed between membrane 138 and membrane 137. Thus by the disposition of membrane 138 the descending annular helical channel progressively decreases in area correspondingly to the decrease of flow beyond the successive mouths, maintaining flow speed. The membrane 138, like membrane 113 of the separator, encloses between it and the central cylinder 125 a progressively widening space which, as well as the space inside of the cylinder, is a dead or idle space. Structurally the central cylinder or empty shaft may be the support or base upon which, as by tight fitting, attaching or welding, the various other walls of the helical element may be mounted.

The successive withdrawal mouths 126, 127, 128, 129, 130 and 131, shown as arranged in groups of three are connected respectively to disposal pipes 141, 142, 143, 144, 145 and 146 by means of transformation pieces interposed between the mouths and the pipes. This construction is indicated by transformation pieces 147 and 148, Fig. 12 and at 149, Fig. 13, leading respectively into pipes 142, 144 and 145.

The operation of the assorter or primary separator is similar to the operation of the helical inlet duct portion of a separating element as already described. The portion of the flow withdrawn by each in the series of withdrawal mouths 126 to 131 is delivered by its transformation piece to a separate one of the disposal pipes 141 to 146. These withdrawn portions of the flow are recombined in groups into secondary combinations for subsequent complete separation. Referring to primary separator 26, Figs. 1 and 2, the grouped disposal pipes 46, 47 and 48 (or in Figs. 10 to 13, pipes 141 to 143) are connected with the first or earlier group in the series of withdrawal mouths and are therebeyond united as the pipe 49 through which the heavier secondary combination is delivered to the separating element 28 of the first separation system 27. Similarly the disposal pipes 71, 72 and 73 (or in Figs. 10 to 13, pipes 144 to 146) are connected to the second or later group in the series of withdrawal mouths, and are therebeyond united as the pipe 74 through which the lighter secondary combination is delivered to the separating element 31 of the second separating system 30.

It is to be understood in regard to the primary separator or assorter 26 that it may be operated with either downflow or upflow of liquid through the helical channel, in the same sense as already described in connection with the inlet channel members of the secondary separators, which involve downflow in Figs. 1 and 2 and upflow in Fig. 2A.

Figure 14A:
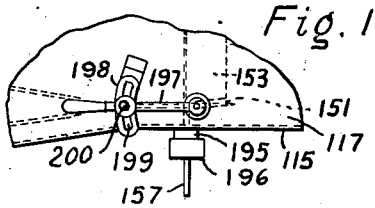
Fig. 14A is a side view of part of Fig. 14, illustrating a means for adjusting the vanes within the transformation section.
Figure 15:
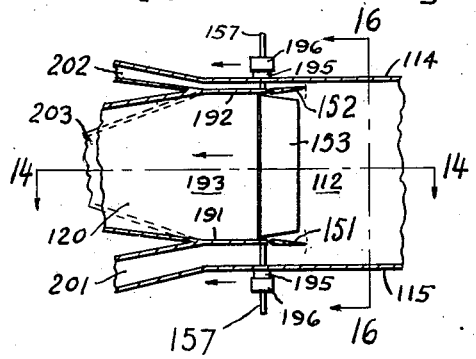
Fig. 15 is a vertical central section on the line 15—15 of Fig. 14.
Figure 16:
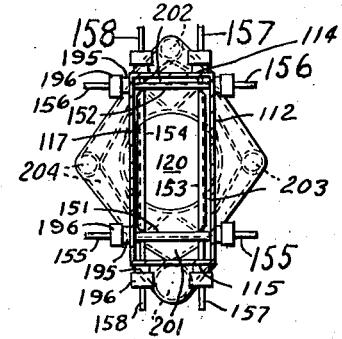
Fig. 16 is a vertical section on the line 16—16 of Fig. 15.

Under certain conditions of operation, variations in load, either seasonal or for other causes, are of such magnitude that it becomes advisable to adjust the effective areas of the withdrawal mouths in the respective transformation sections of one or more of the separating elements 28, 31 or 36. Figs. 14, 15 and 16 show an illustrative arrangement for the purpose, comprising adjustable partitions or vanes 151, 152, 153 and 154 swung by control shafts 155, 156, 157 and 158 respectively. These vanes respectively are continuations in line with fixed partition walls 191, 192, 193 and 194, beyond which the walls are formed to provide separate channels. These partitions correspond with fixed partitions 121C in Fig. 4C. The control shafts are extended through the walls of the transformation section and through stuffing boxes 195 and glands 196, of usual type and are regulated by levers and locked. For example, each shaft may be turned by a hand lever 197 to a selected position and the adjustment fixed by means of a segment 198 formed with an arcuate slot 199 engaged by a nut-and-bolt device 200 on the lever, by which the lever, shaft and vane are secured in their adjusted position.

The figures indicate an inlet section 116C leading to a transformation section 95C, analogous to those shown in Fig. 4C having a central channel 120 for the preponderant liquid component and four surrounding channels 201, 202, 203, and 204, for a case wherein separation between up to five liquids is desirable. Figs. 14 to 16 indicate the five channels, and for each surrounding channel a regulating vane such as those numbered 151 to 154. Each vane is in line with an inner or partition wall of an outgoing channel, and is so pivoted to or near the wall that its free end may be swung in the advancing stream of classified component liquids, to cut off adjustably a greater or lesser thickness of layer of the general flow stream. Having knowledge of the expected proportions of the components the vanes, by their shafts and adjusting means, are set in a way to separate away from the total stream each of the components, other than the main or central component, and direct it into its proper outgoing channel, as nearly as may be done to thus divert each component, to the maximum extent and with minimum mixture of another component and direct it into its designated outgoing channel, leading to a separate pipe conveying it to its intended position in the decanter portion of the apparatus.

In operation, the shifting adjustment of the vane or partition 151, for example, toward the inlet bottom wall 115 of the inlet or transformation section decreases the area of withdrawal mouth of channel 201 while increasing the area of the central withdrawal mouth 120; and adjustment of the partition 151 in the opposite direction or inwardly reverses such area change with respect to the two withdrawal mouths affected. Similarly the swinging of partitions 152 or 153 or 154 toward or away from the exterior walls 114 or 112 or 117 of the transformation section will affect the areas of the withdrawal mouths of channels 202 or 203 or 204, and as well the middle channel 120 of the predominant component. Increasing the effective area of the withdrawal mouth of the central duct 120 of course increases the volume of separated preponderant component (usually water) which is diverted from entering the decanter, thus resulting in reduced flow through the decanter and more effective separating and decanting operations.

A mixing element or device of substantially open type and motor driven is illustrated in the prior Patent No. 2,084,958, located in the inlet to the separating element. It is found preferable in some instances to maintain pressure within the mixer, and a closed or pressure type of mixing element 33 is herein shown in Fig. 2A, and in detail in Figs. 17, 18 and 18A. It comprises, within a built-up housing 171—177, an inlet chamber or section 161, enclosed by a housing portion or shell 172, and its left end head 173; and an outlet section or receptacle 163 for solid materials, enclosed by cylindrical shell 176 and right end head 177; and an annular outlet chamber or section 162 for liquids, enclosed by shell portion 171 and separated from inlet section 161 by a diaphragm or partition 168 and separated from outlet section 163 by diaphragm or wall 169. Surrounded by the annular chamber 162 is a cylindrical perforated or screen member or membrane 164 having its ends fitted within the annular diaphragms 168 and 169 and attached to diaphragm 168 by angle ring 170.

The cylindrical screen may be of mesh or other perforated sheet material and it encloses what may be called the mixing or screen chamber 160. The screen preferably is not completely perforated, but only at selected portions. Thus in Figs. 17 and 18 the perforated area 167 of the screen membrane 164 is shown placed at the bottom. The mixer contains also a driven mixing and feeding device. A helical wiper blade 165, mounted on shaft 166, has its peripheral edge substantially contacting but preferably closely spaced from screen membrane 164, and it is operated by a motor 34 through a reducing gear indicated as 35, as seen in Fig. 2A. The shaft 166, Figs. 17 and 18 extends through the mixer head 173 within stuffing box 174 and gland 175, and extends through head 177 through stuffing box 178 and gland 179.

Figure 17:
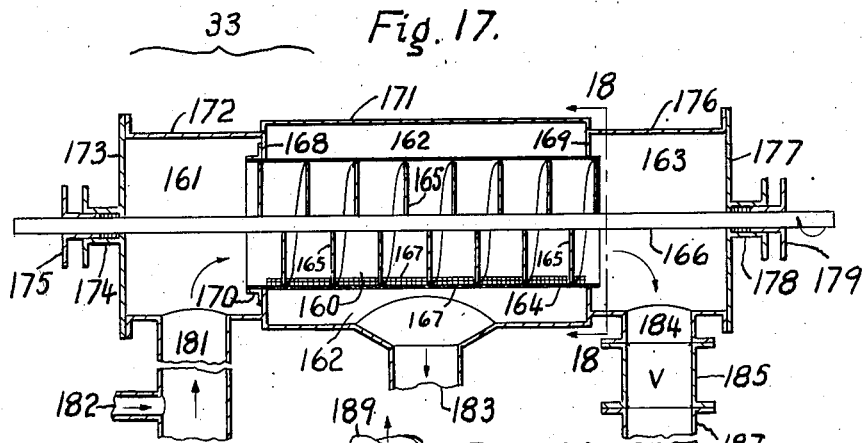
Fig. 17 is a vertical central section of a modified mixing element of closed or pressure type.

The flow of the stream of combined liquids to be separated enters the mixing element through inlet pipe 181 of Fig. 17 or 87 of Fig. 2A. When it is necessary to introduce into the flow an added liquid, such as a separated component, especially for mixing it with an emulsion contained in the mixture, in order to modify the gravity of the emulsion, the introduction can be at any point along pipe 181 as by lateral pipe 182. The pump and connections for handling the introduced or recirculated liquid or separated component are not shown. As a liquid outlet there is shown downtake 183, or 88 in Fig. 2A, and an outlet 184 is provided for solids, if present, the mixer screw 165 acting as a feeder thrusting solids rightwardly toward the chamber 163 and its exit 184. The solid outlet 184 is shown as a downtake pipe or passage having upper and lower discharge or dump valves 185 and 186, with a collecting space or section 187 between, from which received solids can at desired intervals be discharged.

The perforated area of screen element 164 is relatively large so as to reduce the velocity of flow through the perforations and to provide a greater length of time in which to effect contact and mixing of liquid components, these actions being substantially as explained in said Patent No. 2,084,958. Also, illustrative details of the perforations and clearances are described in said prior patent at page 4, column 2, line 6 et seq., and the method of operation at line 27 et seq. The present construction of conditioner or mixer is an improvement in its closed and sealed housing, its internal pressure and otherwise. The reducing means for the more viscous liquid comprises a screen and wiper device, the screen being a perforated cylindrical wall inside an annular chamber, adapted to break up and shred the viscous masses or lumps thereby releasing therefrom a less viscous liquid or liquids, while bringing together different portions of each component.

Figures 18, 18A:
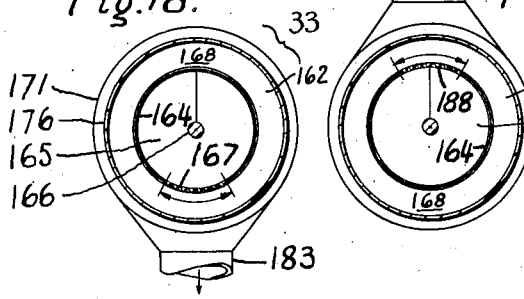
Fig. 18 is a section taken on the section line 18—18 of Fig. 17, arranged with the perforated area at the bottom of the mixing element.
Fig. 18A is a similar section of a mixing element like that of Figs. 17 and 18 but so modified that the perforated area and the liquid outlet are arranged at the top of the mixing element.

In Fig. 18A is shown a view in vertical section similar to Fig. 18 of a modified mixing element, in which the perforated screen area 188 is placed at the top. The placing of the perforated area at the top or at the bottom of the cylindrical screen membrane is determined by the characteristics of the liquid components to be separated. Usually the perforated area is more advantageous at the bottom, as the heaviest component, tar, exceeds in volume the lightest component, oil, and is also the most viscous, and the most in need of breaking up and mixing. Under conditions where the lightest component is the most viscous the perforated area should be placed at the top. The outlet 189 for liquids will then be placed at the top, especially when the preponderant component is the heavier, so that the lighter and more viscous component, moving upwardly toward the outlet under the force of gravity, will be swept along by the flow and acted upon by the helical blade wiping along the perforated zone. Similarly, when the preponderant component is the lighter, the outlet for liquids should be placed at the bottom.

The general method of operation may now be reviewed upon the general showing of apparatus in Figs. 1 and 2 by assuming the continuous supplying by pipe 37 of a hot starting liquor composed for example of water in preponderance and, for example, two heavier components or tars of different gravity, and one lighter component or oil. The pump 38 may be of a type delivering the progressive flow at a predetermined or fixed rate, any deficiencies of supply, as of water, for recirculation being made up from tank 39 or 40 by way of pipes 41 or 42. The pump output passes through the primary separator or assorter 26, needed only because there are over three components. It groups the heaviest three, delivering and merging them through single pipe 49 to the first secondary separator 28, and groups the lightest two, passing them by pipe 74 to the second separator 31; water thus passing to both separators. If there be emulsions, or tar masses embedding water or oil or both, there should be a conditioning operation before separation; and the closed conditioner 33 of Fig. 2A may be used, for example in advance of the separator 28, or better, ahead of the assorter 26; but if conditioning ahead of the pump is desired the open type of conditioner of said prior Patent No. 2,084,958 may be substituted. In the separator 28, both in its helical inlet channel 93 and its succeeding spiral duct 94, Fig. 3, by whirling or revolving motions during progress of the flow and by gravity operation in the duct, effective classification is performed, and the transformation section 95, Figs. 3 and 7, receives the issuing components arranged according to their gravity, and may deliver them accordingly directly into a decanter as in the prior patent; but herein the flow is shown as subdivided by partitions or septa, arranged according to expected volumes, delivering respectively into separate pipes or passages 52, 53 and 54, at least two of which then deliver into the decanter 29 having a tank of such volume as to give each portion of the flow ample time for more complete separation of the three components, to be taken off by separate decanter outlets, as explained. With a properly designed and dimensioned flow transformer or transition section 95, the intermediate component may be largely withdrawn by pipe 54 in a condition free of the heaviest and lightest components, and therefore ready for disposal or recirculation without going to the decanter; and each of the heaviest and lightest liquids will then carry a variable proportion of the intermediate liquid, so that the decanter receives all three, but in a gross volume reduced by the bypassing of the bulk of the intermediate componet, including original supply and recirculated component, a practical advantage permitting the recirculation of larger quantities, for better efficiency, without increase of decanter size. The intermediate liquid may be conducted to the overflow tank 39, for use or disposal. In special cases the separation of components in the helical and spiral passaged separator may be sufficiently complete to permit disposal without the need of later decanting, since much gravity action occurs in the spiral duct, which may be prolonged to a further extent for this purpose. The components passing from the assorter 26 to the second separator 31 may undergo operations analogous to those just described. The final result of passing the initial liquor through the described stages or steps and units of apparatus, is its effective subdivision into its components ready for industrial utilization or other disposal.

There have thus been described liquid separation method and apparatus embodying the principles and attaining the objects of the present invention. Since many matters of operation, combination, construction and arrangement may be variously modified without departing from the disclosed principles it is not intended to limit the invention to such matters except to the extent set forth in the appended claims.

I claim:

1. Apparatus for continuously separating a flowing liquor consisting of a mixture of liquid components of differing gravity and viscosity, having a separator for classifying the component mixture comprising a central upright inlet element and surrounding it an elongated spiral-walled duct traversible outwardly by the liquid flow with the heavier component advancing and descending progressively in contact along the concave duct wall surface for delivery at the lower part of the spiral walled duct and with lighter liquid delivery thereabove; said central inlet element comprising an axial standard and, a helical annular wall forming a channel surrounding said axial standard and composed of an exterior section followed by a section inside of the spiral walled duct, connected liquid tightly to said duct, the convolutions of the exterior section being closed and acting to impose whirling and centrifugal classifying motions upon the flow, and the inside convolutions being formed with successive take-off mouths adapted to skim off from the whirling flow and deliver into the spiral duct first the heavier and later the lighter liquid components; and said inside section having a helical-spiral wall arranged to decrease progressively the helical channel sectional area thereby to maintain substantial flow speed and whirl as the flow volume decreases beyond the successive take-off mouths; and wherein is a flow-transformation walled member into which the spiral duct delivers and formed with partitions subdividing it into separate channels for the outflowing components and proportioned to the expected volumes thereof; with movable vanes for relatively adjusting the partitioned channels to the flow of the respective components.

2. Apparatus for continuously separating four or more liquid components of differing density and viscosity from a flowing mixture thereof, including a primary assorting element comprising an upright helical duct member having in succession liquid classifying and delivery sections of substantial extent and formed with a closed outer shell and an axial standard and a helical interior wall defining the helical duct, and formed at its delivery section with a succession of peripheral take-off mouths delivering at successive elevations from the helical duct, a series of at least four separate flow passages receiving from the respective take-off mouths the classified components, said passages being combined in at least two groups with a plurality of passages in each group, a secondary separating element to which the first passage group conducts its entire flow for further separation and a second secondary separating element to which the second passage group conducts its entire flow for further separation; said apparatus including also, beyond the respective secondary separators, decanters receiving classified components therefrom; and said secondary separators having delivery bypasses for a preponderant component each disposed to conduct such component to bypass the decanter.

3. Apparatus for continuously separating the liquid components of differing density and viscosity from a flowing mixture thereof, comprising a decanter for final separation and, in advance thereof, a spiral-duct separating element operating by centrifugal action and gravity for classifying, rearranging and delivering a plurality of components at predetermined positions in the flow stream, and as a continuation of said spiral duct a walled transformation chamber having partitions forming separate flow channels positioned respectively to receive the classified components in their aforesaid flow positions and with their effective entrance areas proportioned to the expected volume of the components; and passages therebeyond conducting the flow from selected ones of such flow channels to the decanter to conduct a combination of components thereto in predetermined positions in the decanter.

4. The apparatus as in claim 3 and wherein the subdividing partitions in said chamber are provided with movable vanes at the entrances to such channels, and exteriorly accessible means to adjust each of said vanes to vary the channel entrances to accord with the expected volumes of components.

5. Apparatus for continuously separating the liquid components of differing density and viscosity from a flowing mixture thereof, comprising in advance of a decanter a spiral-duct separating element operating by centrifugal action and gravity to classify a plurality of components and deliver them at predetermined zones in the flow stream, and following said spiral duct a walled transformation chamber having partitions forming a plurality of flow channels positioned respectively to receive the classified components from their aforesaid zones, said partitions having adjustably shiftable vanes at the chamber entrance whereby to proportion the effective entrance areas of such channels substantially to the expected volumes of the components; and passages therebeyond conducting the flow from selected ones of such flow channels to predetermined positions in the decanter.

6. Apparatus for continuously separating the liquid components of differing density and viscosity from a flowing mixture thereof, comprising a decanter for final separation and, in advance thereof, a spiral-duct separating element operating by centrifugal action and gravity for classifying, preparing, rearranging and delivering a plurality of components at predetermined positions in the flow stream, and as a continuation of said spiral duct a walled transformation chamber having partitions in selected immersed positions thereby adapted to form separate flow channels to receive respectively the classified components in their aforesaid flow positions and with their effective entrance areas selectively proportioned to the expected volumes of the components; and passages therebeyond arranged as to selected ones of such flow channels to join in confluence en route to the decanter thereby to conduct a combination of components into predetermined positions in the decanter.

7. An apparatus as in claim 6 and wherein the subdividing partitions in said transformation chamber are provided with adjustably shiftable vanes at the entrance to such channels, and exteriorly accessible means to adjust each of said vanes to vary the areas of one or more channel entrances to accord with the expected volumes of components.

8. Apparatus as in claim 6 and wherein there is included in the closed duct flow series, in advance of the spiral-duct separating element, a mixing element comprising a closed housing containing a perforated screen member and a mechanically operated wiper member moving in close proximity to the said screen member whereby the emulsions and lighter masses in the flow which constitute a complex component are, by the action of the screen and wiper elements, brought into contact one with another and are merged so as to form a single simple component suitable for separation by the action of said spiral-duct separating element.

9. Apparatus as in claim 6 and wherein the spiral duct of said spiral-duct separating element has its walls disposed progressively to modify its sectional area whereby to provide a varying intensity of preparatory erosive action to meet the varying requirements and thereby obtain optimum preparation.

10. Apparatus for continuously separating a flowing mixture of separable liquid components of differing gravity and viscosity in which is included a decanter and in advance thereof a separating element for (1) classifying, (2) preparing and positioning and (3) withdrawing the several components, said separating element comprising (a) a helical duct member for classifying the flow, (b) a spiral duct member for preparing and positioning the components in the flow and (c) a flow dividing member for withdrawing the components so positioned; said helical duct member consisting of an axial core, and surrounding it a helical annular wall perpendicular to the axis of the core, which wall, with the outer and inner closure walls, forms a helical duct of which a first section composed of a number of convolutions of an initial group is closed and adapted to impose whirling and centrifugal classifying motions on the flow therethrough, followed by a second or flow-transfer section of which the convolutions are open in being formed with successive take-off mouths and being connected liquid-tightly to said spiral duct member and being adapted to skim off from the whirling flow and deliver into said spiral duct member first the heavier liquid component to flow in contact with the concave side of the spiral partition wall of the said spiral duct member and thereafter the lighter liquid components; the duct in the said transfer section having a helical-spiral inner closure wall constructed and arranged to decrease progressively and proportionately the area of the duct beyond each successive take-off mouth thereby to maintain such aforesaid flow speed and whirl and classifying action as the flow is currently delivered from said transfer section into the spiral duct member for preparation and positioning of the components in the flow; said spiral duct member consisting of a plurality of convolutions of a spirally disposed partition wall and cover plates to which its edges are attached so as to form a continuous spiral duct section beginning at and connected liquid tightly to the withdrawal mouths of the preceding helical duct member, followed by a walled tangential flow section connected liquid-tightly to the succeeding flow-dividing member, whereby in said spiral duct member the several components, received from the helical duct member in determined sequence and placement, are prepared by the centrifugal action of the flow while concurrently, under such centrifugal action combined with the action of the force of gravity, the said components are positioned in the flow for delivery to and withdrawal by the flow dividing member; and said flow dividing member consisting of a walled flow duct connected liquid tightly to the tangential section of the preceding spiral duct member and having partitions dividing it into separate channels formed with receiving mouths sized, shaped and positioned to receive the components to be withdrawn, in their expected position and volume, thereby to forward the components so withdrawn through the separate connections each in desired volume to desired disposal.

11. The apparatus as in claim 10 and wherein the subdividing partitions in the flow dividing member of the said separating element are constructed with movable vanes at the entrances to the said channels, and exteriorly accessible means to adjust said vanes to vary the channel entrances to accord with the expected volume of components to be withdrawn.

12. Apparatus as in claim 10 and wherein the spiral duct member of the said separating element has its walls disposed to modify progressively its sectional area whereby to provide a varying intensity of preparatory erosive action upon the mixed components to meet varying practical requirements and thereby obtain optimum preparation.

13. Apparatus as in claim 3 and wherein is a flow circulating pump and in tandem with such flow circulating pump and in advance of the aforesaid separating element a mixing element comprising a housing containing a perforated screen member and a mechanically operated wiper member moving in close proximity to the said screen member, whereby the emulsions and lighter masses in the flow which constitute a complex component are, by the action of said screen and wiper members, brought into contact one with another and merged thereby to form a single simple component suitable for separation by the action of the said separating element.

14. Apparatus as in claim 3 and wherein the said passages beyond the walled transformation chamber are fitted with means for controlling the relative resistance to flow therethrough whereby the velocity and volume of flow in the several passages is adjustably predetermined thereby to control the volume of flow to and through the decanter.

15. Apparatus as in claim 3 and wherein one of the said passages beyond the walled transformation chamber is connected to a storage vessel other than the decanter, and wherein the several passages are fitted with means for adjusting the relative resistance to flow therethrough whereby the velocity and volume of flow in the several passages is variably adjustable and a maximum quantity of the separated preponderant component is diverted to storage and is made currently available for process reuse and for recirculation in the separating apparatus.

16. Apparatus as in claim 3 and wherein for one of said passages arranged to divert its liquid from entering the decanter is an elevated overflow weir having its effective overflow level at a predetermined level well above the said transformation chamber and approximately near the decanter liquid top level, whereby, according to the relative liquid heads in said passage and the decanter respectively, the rate of flow through said passage and over said weir for diversion from the decanter is predetermined, and thereby the rate of flow into and from the decanter is predeterminable.

17. Apparatus for continuously separating from each other two separable components of a continuously flowing liquid mixture thereof supplied from an initial source in varying volume of total flow and in varying proportions of such separable components, and wherein such components are of substantially different density and viscosity and comprise a minor volume of a more viscous component and a major volume of a more fluent component; said apparatus comprising, in combination with a decanter, a whirl-producing unit adapted continuously to effect the classifying, preparing and positioning of the respective components; a supply passage arranged to conduct the total mixture flow into said unit; first and second withdrawal channels closely beyond and connected with said unit and adapted continuously and selectively to receive and withdraw therefrom the respective components, namely, the viscous first component modified by admixture with a stabilizing variable small volume of the fluent component and the remaining fluent second component free of the first component; said first withdrawal channel having an extension to deliver the modified first component into the decanter for further separation therein; and said second withdrawal channel having an extension to conduct said remaining second component to a place of re-use or other disposal, with means for continuously stabilizing the rate of total flow through said unit comprising an extension passage arranged to recirculate and deliver continuously from said second channel extension to said supply passage a portion of such withdrawn fluent component at a variable rate adequate to maintain substantially constant the volume rate and velocity of the total flow through said unit; and weir means between said second channel and its extension channel adapted to maintain for said second channel a continuous overflow of the fluent component therefrom at an elevation determined to correspond substantially with the desired operating surface level in the decanter; whereby there is maintained in said second channel a total resistance to flow which is currently substantially equal to the total resistance to flow in such first channel, and whereby, through the resulting equalization of pressures in said first and second channels there are continuously maintained substantially constant rates of withdrawal of components from said unit through the respective withdrawal channels.

18. Apparatus for liquid separation as in claim 17 and wherein for controlling or correcting the rates of selective withdrawal of components into and through the respective first and second withdrawal channels to accord with prevailing conditions, there is provided a means for adjusting the elevation of the edge or weir over which the more fluent second component is overflowed, thereby to alter relatively the resistance to flow through the respective channels.

JAMES F. HUNTER.

REFERENCES CITED

The following references are of record in the file of this patent:

UNITED STATES PATENTS

| Number | Name | Date |
|---|---|---|
| 716,703 | Gathmann | Dec. 23, 1902 |
| 1,412,738 | Heller | Apr. 11, 1922 |
| 1,617,737 | Averill | Feb. 15, 1927 |
| 1,880,185 | Kerns et al. | Sept. 27, 1932 |
| 1,914,282 | O'Toole | June 13, 1933 |
| 1,928,282 | Elliot | Sept. 26, 1933 |
| 2,084,958 | Hunter | June 22, 1937 |
| 2,273,915 | Wellman | Feb. 24, 1942 |
| 2,319,962 | Walker | May 25, 1943 |

FOREIGN PATENTS

| Number | Country | Date |
|---|---|---|
| 131,087 | Great Britain | Aug. 21, 1919 |
| 792,307 | France | Oct. 14, 1935 |
| 82,596 | Switzerland | Oct. 1, 1919 |